(12) United States Patent
Cregut et al.

(10) Patent No.: US 8,733,299 B2
(45) Date of Patent: May 27, 2014

(54) COOLING DEVICE FOR AN AUTOMOTIVE VEHICLE

(75) Inventors: Samuel Cregut, Saint-Remy-les-Chevreuse (FR); Claire Oberti, Paris (FR); Marco Marsilia, Boulogne Billancourt (FR)

(73) Assignee: Renault S.A.S., Boulogne Billancourt (FR)

( * ) Notice: Subject to any disclaimer, the term of this patent is extended or adjusted under 35 U.S.C. 154(b) by 106 days.

(21) Appl. No.: 13/263,004

(22) PCT Filed: Apr. 9, 2010

(86) PCT No.: PCT/FR2010/050689
§ 371 (c)(1),
(2), (4) Date: Dec. 1, 2011

(87) PCT Pub. No.: WO2010/116106
PCT Pub. Date: Oct. 14, 2010

(65) Prior Publication Data
US 2012/0067562 A1    Mar. 22, 2012

(30) Foreign Application Priority Data

Apr. 9, 2009 (FR) ..................................... 09 52363

(51) Int. Cl.
*F02B 63/00* (2006.01)
*F02B 43/08* (2006.01)

(52) U.S. Cl.
USPC .................................................. 123/2; 123/3

(58) Field of Classification Search
USPC ....................................................... 123/2, 3
See application file for complete search history.

(56) References Cited

U.S. PATENT DOCUMENTS

| | | | | |
|---|---|---|---|---|
| 4,605,163 A | * | 8/1986 | Hayashi | ........................ 237/2 A |
| 4,930,460 A | | 6/1990 | Aihara et al. | |
| 5,161,563 A | * | 11/1992 | Thompson | ........................ 137/1 |
| 6,464,027 B1 | * | 10/2002 | Dage et al. | ................. 180/65.22 |
| 6,598,671 B1 | * | 7/2003 | Zeng et al. | ..................... 165/240 |
| 2003/0113213 A1 | | 6/2003 | Chekaiban et al. | |

(Continued)

FOREIGN PATENT DOCUMENTS

DE    30 24 209    1/1981
DE    195 42 125    5/1996

(Continued)

OTHER PUBLICATIONS

U.S. Appl. No. 13/263,796, filed Oct. 10, 2011, Oberti, et al.
International Search Report issued Aug. 3, 2010 in PCT/FR10/050689 filed Apr. 9, 2010.

*Primary Examiner* — Lindsay Low
*Assistant Examiner* — Charles Brauch
(74) *Attorney, Agent, or Firm* — Oblon, Spivak, McClelland, Maier & Neustadt, L.L.P.

(57) ABSTRACT

A cooling device for an automotive vehicle of electric type, the cooling device being able to be powered up or powered down and including a cooling circuit capable of cooling an engine assembly including an electronic driver system using a coolant, the cooling circuit being controlled by a control system capable of keeping the device powered up when the vehicle is at end of mission and the temperature of the coolant is above a threshold temperature. The electric vehicle includes a battery charger assembly, and the cooling circuit is capable of cooling the charger assembly and the engine assembly.

12 Claims, 2 Drawing Sheets

(56) References Cited

U.S. PATENT DOCUMENTS

| | | | |
|---|---|---|---|
| 2004/0031452 A1* | 2/2004 | Yamazaki | 123/41.05 |
| 2004/0069546 A1* | 4/2004 | Lou et al. | 180/65.2 |
| 2008/0060589 A1* | 3/2008 | Carney et al. | 123/41.31 |
| 2009/0139686 A1* | 6/2009 | Suzuki | 165/42 |
| 2009/0203497 A1* | 8/2009 | Imediegwu | 477/5 |
| 2009/0289583 A1 | 11/2009 | Yoshida | |
| 2010/0006351 A1* | 1/2010 | Howard | 180/2.2 |
| 2010/0170455 A1* | 7/2010 | Feldhaus et al. | 123/41.08 |

FOREIGN PATENT DOCUMENTS

| | | |
|---|---|---|
| EP | 0 323 211 | 7/1989 |
| EP | 1 308 610 | 5/2003 |
| EP | 1 965 489 | 9/2008 |
| EP | 2 045 452 | 4/2009 |
| FR | 2 808 304 | 11/2001 |

* cited by examiner

COOLING DEVICE FOR AN AUTOMOTIVE VEHICLE

BACKGROUND

The subject of the invention is a cooling device for an automotive vehicle of electric type, comprising a cooling circuit capable of cooling an engine assembly using a coolant. The invention applies advantageously to electric automotive vehicles.

In an internal combustion engine, the repeated combustions overheat the parts that are in contact, such as, for example, the pistons, the cylinders, and the valves, and are transmitted to all the mechanical parts of the engine. It is therefore necessary to cool them otherwise there is a risk of destruction. For correct operation, explosion engines thus need an even and suitable temperature.

In the case of a vehicle with electrical propulsion, it is also necessary to cool the various elements of the drive system.

It is known practice to use a cooling system comprising one or more pumps for circulating a coolant through the engine, and a radiator, which is a heat exchanger used to cool the liquid.

After the vehicle has been stopped and locked by the driver, when the vehicle is at end of mission, the cooling device is conventionally placed on standby, that is to say, in a powered down state, in order not to unnecessarily consume electrical energy from the battery.

However, in some cases, the cooling of the engine assembly may be desirable after the vehicle has stopped, which is something that the conventional cooling devices cannot provide.

BRIEF SUMMARY

The invention aims to remedy these drawbacks.

The subject of the invention is thus a cooling device for an automotive vehicle of electric type, the cooling device being able to be powered up or powered down and comprising a cooling circuit capable of cooling an engine assembly including an electronic driver system using a coolant, the cooling circuit being controlled by a control system capable of keeping the device powered up when the vehicle is at end of mission and the temperature of the coolant is above a threshold temperature.

In the device according to the invention, the electric vehicle includes a battery charger assembly, and the cooling circuit is capable of cooling the charger assembly and the engine assembly.

Thus, by virtue of the invention, it is possible to prevent the powering down of the cooling device at the end of the vehicle's mission, when the cooling of the engine is insufficient.

The expression "vehicle at end of mission", within the meaning of the invention, should be understood to mean that the vehicle is stopped and that it is locked. The computers of the vehicle are then powered down.

The device may include a first pump capable of selectively supplying coolant to the engine assembly and a second pump capable of selectively supplying coolant to the charger assembly.

To this end, the device may include a first valve capable of preventing a flow of coolant in the charger assembly, and a second valve capable of preventing a flow of coolant in the engine assembly.

The device may also include a hydraulic restriction that makes it possible to maintain a minimum flow rate of coolant in the engine assembly.

The control system is advantageously capable of servo-controlling the flow rate of each pump in a closed-loop regulation system according to the temperature of the coolant and a setpoint temperature. Thus, the servo-controlling of the flow rate of each pump in closed-loop mode makes it possible to limit its wear and its energy consumption.

The control system is advantageously capable of stopping the device being kept powered up, that is to say, it is capable of powering it down, if the battery voltage is below a setpoint value, so as to avoid excessively discharging the battery.

The control system is advantageously capable of stopping the device being kept powered up, that is to say, it is capable of powering it down, if the time elapsed since the stopping of the vehicle, in particular since the end of mission of the vehicle, exceeds a predetermined time interval, so as not to continue cooling indefinitely, even if the temperature of the coolant is too high.

The predetermined time interval may be determined on the temperature outside the vehicle.

BRIEF DESCRIPTION OF THE DRAWINGS

Other features and advantages of the present invention will become more clearly apparent on reading the following description, given as an illustrative and non-limiting example, and in light of the appended drawings in which.

DETAILED DESCRIPTION

Figure 1:
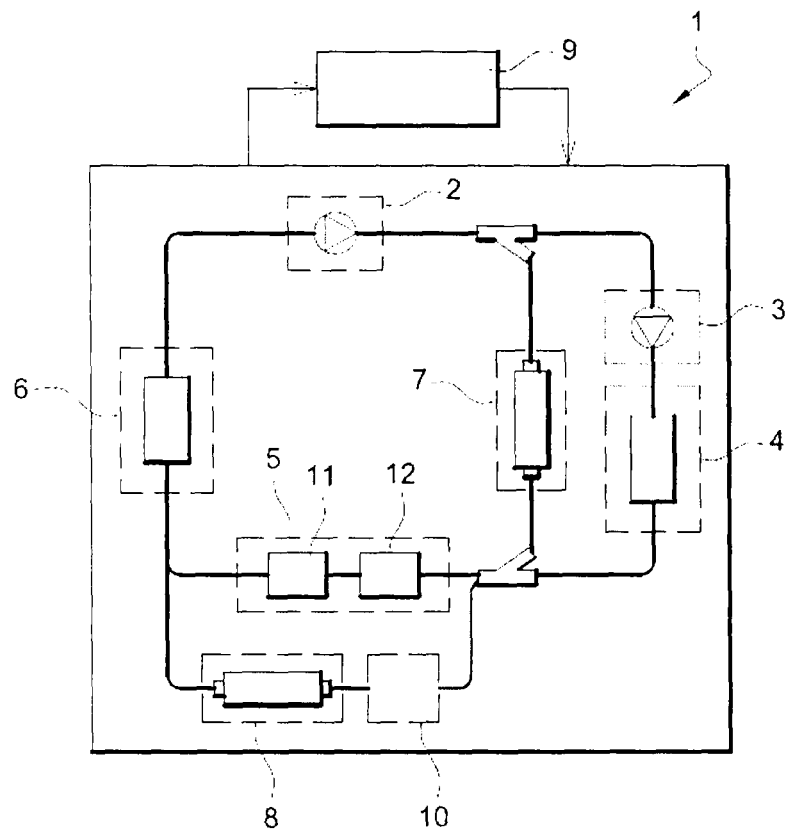
FIG. 1 illustrates, in block diagram form, a cooling device according to the invention, incorporated in an electric vehicle.

The cooling device 1, as illustrated in FIG. 1, comprises a first electric pump 2, a second electric pump 3, a battery charger 4, an engine assembly 5, a radiator 6, as well as a first solenoid valve 7 and preferentially a second solenoid valve 8. The first electric pump 2, the second electric pump 3, the first solenoid valve 7 and the second solenoid valve 8 are linked to a control device 9.

The first electric pump 2 is intended to be used when the vehicle is running, whereas the second electric pump 3 is intended to be used when recharging the battery. The flow rate of the first pump 2 and the flow rate of the second pump 3 can be set using a control signal.

The charger 4 is used, when the vehicle is stopped, to recharge the electric traction battery, not represented, from the domestic electric mains supply.

The first solenoid valve 7 is used to short-circuit the second pump 3 and the charger 4, when the vehicle is running, whereas the second solenoid valve 8 is used to short-circuit the engine assembly 5 when recharging the battery, when it is estimated that the cooling of the engine assembly 5 is not necessary. The second solenoid valve 8 may be linked to a hydraulic restriction 10 which makes it possible to produce a head loss, and thus retain a flow rate of coolant in the engine assembly 5, even when the second solenoid valve 8 is in passing mode.

The engine assembly 5 comprises an engine 11 and an electronic driver system 12 intended in particular to convert the DC voltage from the battery into AC voltage.

The radiator 6 is used to cool the coolant, in a manner similar to the cooling device of an internal combustion engine. It is equipped with an electric fan, not represented.

The engine assembly 5 has to be cooled when the vehicle is running, as does the charger 4 when the vehicle is stopped.

The cooling strategy is managed by the control device 9. The control device 9 is a computer which is linked with sensors of the cooling circuit, in particular coolant temperature sensors. The computer 9 also drives the pumps 2, 3, the solenoid valves 7, 8, and the electric fan set of the radiator 6. The computer 9 is also advantageously linked to other computers of the vehicle, via a CAN (Controller Area Network) bus-type network for example, in order to obtain other measurements necessary to the cooling strategy.

Figure 2:
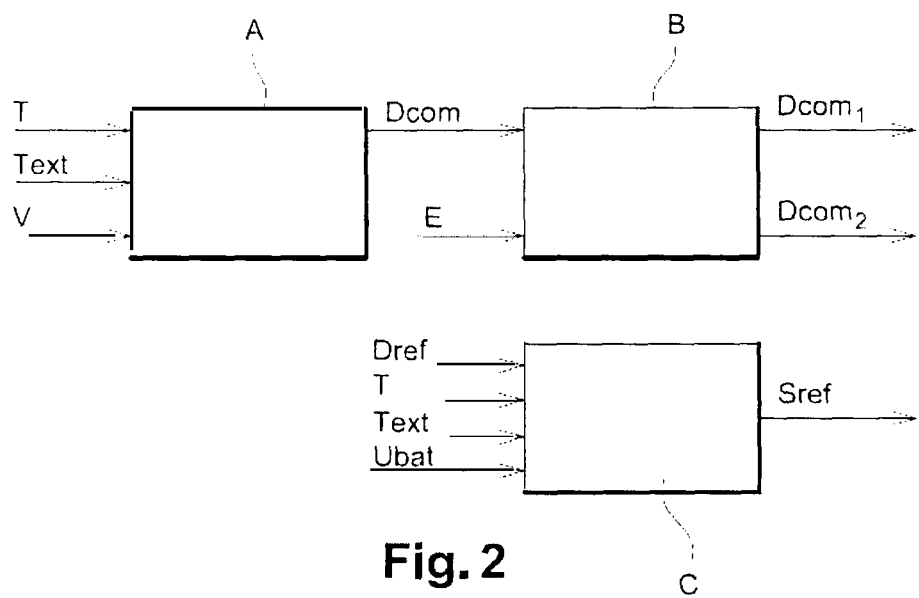
FIG. 2 illustrates, in block diagram form, a control strategy for the device.

The control strategy for the cooling circuit can be implemented in the form of three modules A, B, C, as illustrated in FIG. 2. The module A relates to the regulation of the temperature of the coolant. The module B relates to the choice of electric pump 2, 3. The module C relates to the prevention of the powering-down of the device 1.

The module A is responsible for generating a coolant flow rate control according to the state of the vehicle (running or recharging the battery when stopped). The inputs of the module A are:
- the temperature T of the coolant: this can be obtained using one or more temperature sensors,
- the temperature $T_{ext}$ outside the vehicle, and
- the speed V of the vehicle.

The inputs of the module B are:
- the flow rate control $D_{com}$ from the module A, and
- the state E of the vehicle: this is a signal originating from the central computer of the car which has the value 1 if the vehicle is in battery recharging mode and which has the value 0 if the vehicle is in running mode.

The outputs of the module B are:
- the flow rate control $D_{com1}$ for the first pump, used in running mode. This is a signal between 0 and 100 and expressing the percentage of the maximum flow rate that can be produced by the pump, and
- the flow rate control $D_{com2}$ for the second pump, used in recharging mode. This is a signal between 0 and 100 and expressing the percentage of the maximum flow rate that can be produced by the pump.

To put it simply, a choice can be made to use only the second pump if the vehicle state signal has the value 1 and to use only the first pump if the vehicle state signal has the value 0.

The objective of the module B is to automatically vary the flow rate control between a minimum flow rate value $D_{min}$ and a maximum flow rate value $D_{max}$, according to the temperature of the coolant. As long as the temperature of the coolant is below a setpoint temperature, the flow rate control remains at the minimum value $D_{min}$. As soon as the temperature of the coolant exceeds the setpoint temperature, the flow rate control is obtained by closed-loop regulation, the setpoint concerned being the setpoint temperature, and the feedback loop concerned being the measured temperature of the coolant.

The inputs of module C are:
- the vehicle cooling request $D_{ref}$: this is a logic signal originating from the central computer of the vehicle and which indicates if it is necessary to cool the electrotechnical members of the vehicle, in running or battery recharging mode. If the signal has the value 1, the cooling is necessary, otherwise it has the value 0.
- the temperature T of the coolant: this can be obtained using one or more temperature sensors,
- the temperature $T_{ext}$ outside the vehicle, and
- the battery voltage $U_{bat}$.

The module C generates as output a cooling signal $S_{ref}$ which has the value 1 if the cooling device can be stopped, that is to say that the pumps can be cut off and powered down, or which has the value 0 if the powering-down is not authorized, and the electrotechnical members of the vehicle must continue to be cooled.

Figure 3:
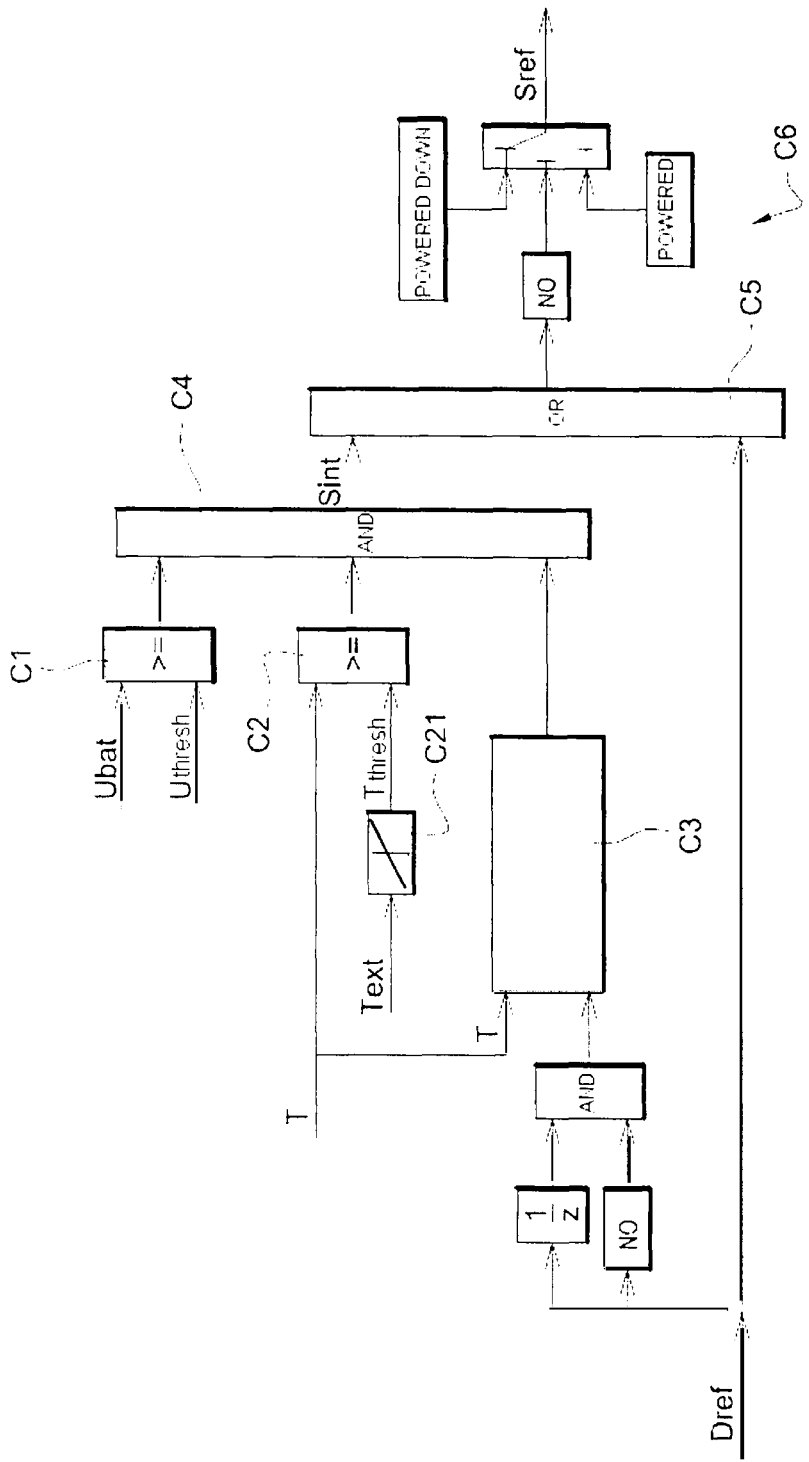
FIG. 3 is a detailed view of a block of FIG. 2.

One possible embodiment of the module C is illustrated in FIG. 3. In this embodiment, the aim is to prevent the cooling system from being placed on standby when the temperature of the coolant is above a threshold value and do so subject to two conditions. On the one hand, not to continue cooling if the battery voltage is below a threshold value. In fact, if the battery voltage is too low, there is a risk of having a failure immobilizing the vehicle. On the other hand, not to continue cooling indefinitely if the cooling temperature remains above the temperature threshold. The cooling time after the vehicle is stopped, in particular at the end of the mission of the vehicle, is therefore limited to a maximum duration. This duration may depend on the temperature of the coolant at the time when the vehicle was stopped or at the time of the end of the mission. The higher this temperature, the longer the maximum duration.

The module C comprises three condition blocks C1, C2 and C3, two logic gate blocks C4 and C5, and an output block C6.

The signal $S_{int}$ prohibiting placing the device on standby is obtained when the signal from the block C4 is TRUE, that is to say when the three conditions C1 to C3 are satisfied.

The condition C1 is satisfied if the voltage $U_{bat}$ of the battery is above a threshold voltage $U_{thresh}$, for example 10.7 V for a 14 V battery.

The condition C2 is satisfied if the temperature T of the coolant is above a threshold temperature $T_{thresh}$ This threshold temperature $T_{thresh}$ may be predetermined according to a map C21 of threshold temperature values according to the temperature $T_{ext}$ outside the vehicle. In practice, the lower the outside temperature $T_{ext}$ the more possible it becomes to authorize placing on standby for high temperatures, because the members of the vehicle will cool more quickly.

The condition C3 is satisfied if a time delay is running, triggered after stopping the cooling request $D_{ref}$, when $D_{ref}$ has the value 0 and the preceding value was 1. The time delay may be generated by a map of time delay values according to the temperature $T_{ext}$ outside the vehicle. The higher the temperature of the coolant, the longer the time delay. As soon as a standby condition is detected, when the signal changes to 1, the time delay is sent to a down-counter block.

The output block C6 is obtained from the logic gate block C5 which is a logic OR gate. The cooling is thus enabled as soon as the cooling of the vehicle is requested (in running mode or recharging mode), or the standby prohibition signal is TRUE.

Although the device described above includes two pumps, the invention may also relate to a device including one or more than two pumps. It may also be applied to a petrol engine equipped with electric water pumps.

The invention claimed is:

1. A cooling device for an automotive vehicle of electric type, the cooling device being able to be powered up or powered down and comprising:
   a cooling circuit capable of cooling an engine assembly including an electronic driver system using a coolant, the cooling circuit being controlled by a control system capable of keeping the device powered up when the vehicle is at end of mission and the temperature of the coolant is above a threshold temperature, the vehicle being at the end of mission when the vehicle is stopped and locked,
   wherein the electric vehicle includes a battery charger assembly, and the cooling circuit includes a first valve arranged in parallel with the battery charger assembly and a second valve arranged in parallel with the engine assembly including the electronic driver system such that the control system is configured to control the first valve and the second valve to supply the coolant to the charger assembly without supplying the coolant to the engine assembly including the electronic driver system.

2. The device as claimed in claim 1, further comprising a first pump capable of selectively supplying coolant to the engine assembly and a second pump capable of selectively supplying coolant to the charger assembly.

3. A cooling device for an automotive vehicle of electric type, the cooling device being able to be powered up or powered down and comprising:
   a cooling circuit capable of cooling an engine assembly including an electronic driver system using a coolant, the cooling circuit being controlled by a control system capable of keeping the device powered up when the vehicle is at end of mission and the temperature of the coolant is above a threshold temperature,
   wherein the electric vehicle includes a battery charger assembly, and the cooling circuit includes a first valve arranged in parallel with the battery charger assembly and a second valve arranged in parallel with the engine assembly including the electronic driver system such that the control system is configured to control the first valve and the second valve to supply the coolant to the charger assembly without supplying the coolant to the engine assembly including the electronic driver system,
   wherein the cooling device further comprises a first pump capable of selectively supplying coolant to the engine assembly and a second pump capable of selectively supplying coolant to the charger assembly, and
   wherein the control system opens the first valve to prevent a flow of the coolant in the charger assembly.

4. The device as claimed in claim 1, further comprising a hydraulic restriction that makes it possible to maintain a minimum flow rate of coolant in the engine assembly when the second valve is open.

5. The device as claimed in claim 2, wherein the control system is capable of servo-controlling the flow rate of each pump in a closed-loop regulation system according to temperature of the coolant and a setpoint temperature.

6. The device as claimed in claim 1, wherein the control system is capable of stopping the device being kept powered up if a voltage of a battery charged by the charger assembly is below a setpoint value.

7. The device as claimed in claim 1, wherein the control system is capable of stopping the device being kept powered up if a time elapsed since the end of mission of the vehicle exceeds a predetermined time interval.

8. The device as claimed in claim 7, wherein the predetermined time interval is determined based on temperature outside the vehicle.

9. The device as claimed in claim 1, wherein the control system is configured to control the first valve and the second valve to supply the coolant to the engine assembly including the electronic driver system without supplying the coolant to the charger assembly.

10. The device as claimed in claim 1, wherein the first valve is a solenoid valve and the second valve is a solenoid valve.

11. A cooling device for an automotive vehicle of electric type, the cooling device being able to be powered up or powered down and comprising:
   a cooling circuit capable of cooling an engine assembly including an electronic driver system using a coolant, the cooling circuit being controlled by a control system capable of keeping the device powered up when the vehicle is at end of mission and the temperature of the coolant is above a threshold temperature,
   wherein the electric vehicle includes a battery charger assembly, and the cooling circuit includes a first valve arranged in parallel with the battery charger assembly and a second valve arranged in parallel with the engine assembly including the electronic driver system such that the control system is configured to control the first valve and the second valve to supply the coolant to the charger assembly without supplying the coolant to the engine assembly including the electronic driver system,
   wherein the cooling device further comprises a first pump capable of selectively supplying coolant to the engine assembly and a second pump capable of selectively supplying coolant to the charger assembly, and
   wherein the control system opens the second valve to prevent a flow of the coolant in the engine assembly.

12. The device as claimed in claim 2, wherein the second pump is directly upstream of the charger assembly to selectively supply the coolant directly to the charger assembly.

* * * * *